INVENTORS
WALTER HOCHWALD
WILLIAM A. FARRAND
ORRIS H. FLATTEN
BY
John A Duffy
AGENT

INVENTORS
WALTER HOCHWALD
WILLIAM A. FARRAND
BY ORRIS H. FLATTEN

*John A Duffy*

AGENT

Oct. 1, 1963     O. H. FLATTEN ETAL     3,105,927
DIGITAL MOTOR POSITIONING SERVO

Filed Nov. 25, 1960     4 Sheets-Sheet 3

INVENTORS
WALTER HOCHWALD
WILLIAM A. FARRAND
BY ORRIS H. FLATTEN

AGENT

United States Patent Office 3,105,927
Patented Oct. 1, 1963

3,105,927
DIGITAL MOTOR POSITIONING SERVO
Orris H. Flatten and William A. Farrand, Fullerton, and Walter Hochwald, Downey, Calif., assignors to North American Aviation, Inc.
Filed Nov. 25, 1960, Ser. No. 71,514
12 Claims. (Cl. 318—19)

This invention relates to digital servos and more particularly to a digital positioning servo for controlling the shaft position of a motor in accordance with a digital command signal.

Digital servos may be utilized in systems for controlling the position of the shaft output of a motor in accordance with command signals from a digital computer. In such systems precision positioning of the shaft output may be achieved with a comparison type digital servo system utilizing a drive signal proportional to the difference between a command signal originating in the digital computer and a position signal originating from the output shaft. In many applications it is necessary to control the shaft output of a substantial number of motors from a single computer. For better efficiency and reliability, it is desirable to provide a simplified system requiring a minimum of control storage capacity in the digital computer. Additionally, it is necessary to provide a system for providing a highly accurate shaft position while maintaining optimum stability of the system at all times.

Servo systems for controlling shaft positions have been inefficient, inaccurate, and unreliable. Inefficiency has resulted from the necessity of providing storage capacity and associated control circuitry in the digital computer for each of the motors being controlled. In a system having a large number of motors, this excessive amount of storage capacity and the control circuitry in the computer greatly increases the size of the computer required. Systems for controlling shaft positions in the past have been inaccurate due to the inability to provide a stable and reliable system to overcome the inherent stability problems arising from the motor driving the shaft. The disadvantages of the prior art enumerated above have severely limited the precision control of shaft positions in digital control devices. Accordingly, it is an object of this invention to provide an improved digital motor positioning control system.

The digital motor positioning servo system of this invention controls the position of the shaft of one motor, or a number of motors, according to a desired position command signal stored in a digital computer. Simplified circuitry is included which allows the sharing at the same time, of the position command signals from the digital computer by each of several motors controlling a shaft position. The time sharing of the command signals permits a simplification of the storage capacity and control in the digital computer. Highly reliable and accurate stabilization is provided for each of the individual servo systems controlling the motors by the utilization of inertial damping structure to stabilize the motor.

It is therefore another object of this invention to effect a speedy and precision positioning of a driven shaft in accordance with a coded signal stored in a digital computer.

It is a further object of this invention to provide a system for controlling a plurality of motor shafts in accordance with single command signals from a digital computer.

It is still another object of this invention to provide a digital motor positioning servo for converting digital type command signals to alternating-current signals for controlling the motor driving a shaft.

These and other objects of the invention will become apparent from the following description read in connection with the accompanying drawings in which.

In accordance with one aspect of the digital motor positioning servo of this invention, a digital servo system is provided which includes an electrical motor for producing an output shaft movement in response to an electrical input. An encoder sensing the shaft movement generates a set of position signals and feeds them to a comparator in a digital computer which also receives a series of command motion pulses from a position command storage in the computer. The comparator generates at its output signals indicative of the difference between the command storage pulses and the encoder position pulses. Coincidence means are provided responsive to the command signals and a motor select signal stored in the digital computer for generating a drive signal which is fed to the input of the motor. The motor may be an alternating-current motor having, for example, inertial damping means for resisting changes in the velocity of the shaft output and which has its electrical input windings responsive to the drive signal at the output of the coincidence means. An alternating-current drive signal is generated by an alternating-current power switch responsive to the output of the coincidence means and an alternating-current signal for switching the alternating-current signal to the input windings of the motor in accordance with control from the output of the coincidence means.

In accordance with a further aspect of the invention, digital servo control is provided for a plurality of motors, each having output shaft movements in response to command signals stored in the position command storage of the digital computer. Coincidence means are provided which are responsive to each command signal from the position command storage and a motor select signal according to a desired motor for generating a drive signal in the motor control system of the selected motor. In this manner, each command signal in the digital computer is common to all of the motor control systems of the motors.

Figure 1:
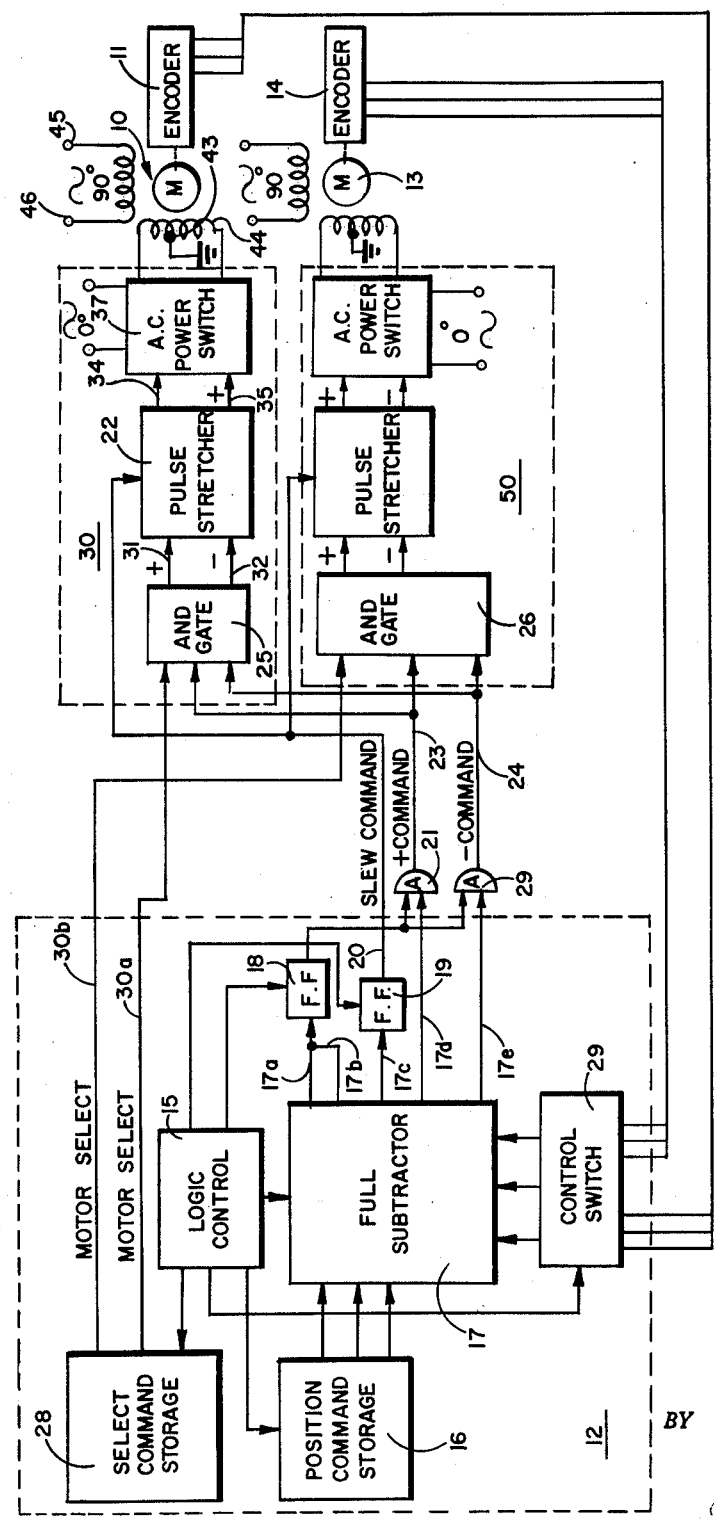
FIG. 1 is a functional block diagram of a closed loop digital servo system embodying the principles of this invention.

Referring now to FIG. 1, a functional block diagram of the servo system of the invention, a motor 10 provides the desired rotation of a motor shaft whose position is continuously sensed by an encoder 11 and fed back to a digital computer 12 in the form of parallel electrical signals indicative of the shaft position of motor 10. In the digital computer 12, there exists a position command storage device 16 which stores information in the form of digits of a command number indicative of a predetermined desired shaft positioned for the motor 10.

A control switch 29 is connected to receive the output signals of the encoder 11, and in addition, to receive output signals from the encoders of subsequent motors, such as the encoder 14 of a subsequent motor 13. The switch 29 feeds the signals from one of the motors to one of the inputs of a full subtractor 17. The subtractor 17 has its other input responsive to the number stored in the position command storage 16. A logic control 15 in the computer 12 controls the operation of the position command storage 16 and the control switch 29 to select the encoder signals and command signals to be fed to the subtractor 17. As shown for illustration purposes, the encoders 11 and 14, as well as the command storage 16, are assumed to be presenting signals having three digits representing one number. The full subtractor 17, also subject to control by the logic control 15, subtracts the number presented by the switch 29 from the number presented by the command storage 16 providing an output number on the lines 17a, 17b, and 17c, indicative of the difference or error between the motor shaft position and the desired stored shaft position. The subtractor also provides an output on the line 17d, indicative of one sense of the difference (positive for explanation purposes) and an output on the line 17c, indicative of the other sense of the difference (negative).

A logic flip flop 19, responsive to the digit output on the line 17c, which is the highest stage of the difference number provided by the subtractor 17, presents a slew command signal at its output on line 20 indicative of a predetermined large difference between the shaft position signal number and the command signal number. Logic AND gates 21 and 27 are responsive to the positive sign signal on line 17d and the negative sign signal on line 17c, respectively, in addition to the output of a logic flip flop 18. The flip flop 18 is responsive to the lower stages 17a, and 17b, to provide a signal to both AND gates 21 and 27 when a difference number is provided by the subtractor 17. Thus, when the difference number is positive, a signal appears on the line 23, and when the difference number is negative, a signal appears on the line 24. The logic flip flops and AND gates are all connected to be controlled for logic purposes by the logic control 15.

Also included in the computer 12 is a select command storage device 28 in which are stored select signals each indicative of a single motor, such as the motor 10, to be controlled. The motor select signals may be provided on the lines 30a and 30b, for example. The logic control 15 provides control of the select command storage 28 to maintain proper synchronism with the position command storage 16 and the control switch 29 whereby the motor select signal on the line 30 indicates the same motor as the command signals on lines 20, 23, and 24.

In the digital computer 12, the functional blocks may be mechanized in several ways well known in the digital computer art. For example, the full subtractor 17 may handle the inputs thereto in a serial or a parallel manner as desired. Full subtractors are well known in the art, as shown for example, on pages 113-135 in the publication "Arithmetic Operations In Digital Computers," by R. K. Richards, published in 1955 by Van Nostrand. The logic control 15, select command storage 28, position command storage 16, and the control switch 29, all may be mechanized according to well-known principles in the digital computer art.

The motor select signals on the lines 30a and 30b are fed to AND gates 25 and 26 of motor controllers 30 and 50 respectively, it being understood that two motor controllers and two select signals are shown by way of example only. Also, each of the positive and negative command signals on the lines 23 and 24 are fed to AND gates 25 and 26. The AND gate 25 will present a positive drive signal at the line 31 to a pulse stretcher 22 upon coincidence of a positive command signal from the line 23 and a motor 10 select signal from the storage device 28 in the computer 12. Similarly, the AND gate 25 presents a negative drive signal on the line 32 upon coincidence of a negative command signal and a motor 10 select signal at its input. The pulse stretcher 22 generates a positive drive signal at the line 34 and a negative drive signal at the line 35, in response to inputs thereto at the lines 31 and 32. Additionally, if there is also present a slew command signal on the line 20, the pulse stretcher 22 presents an output at one of the lines 34 or 35 which is a pulse of increased width to provide a drive signal to the input of an A.-C. power switch 37 in the controller 30 which is of greater energy than when no slew command signal is being received by the pulse stretcher 22. The A.-C. power switch 37, responsive to the drive signals from the lines 34 and 35, operates to switch alternating current from input terminals 39 and 40 across a winding 41 of the motor 10. If the signal from the pulse stretcher 22 is indicative of a positive drive on line 34, the switch 37 presents alternating current across the winding 41 between the terminal 42 and the ground terminal 43. Conversely, if the drive signal from the stretcher 22 is on line 35, alternating current is presented across the winding 41 between the terminals 44 and 43. Motor 10, shown in FIG. 1 as a two-phase motor, receives an alternating-current input from the terminals 45 and 46 which is 90 degrees out of phase with the alternating-current input from the terminals 39 and 40 presented across the winding 41. In this manner, the motor 10 is caused to rotate in one direction for positive command signals and in the other direction for negative command signals, in accordance with the command and select signals from the computer 12.

Similarly, a motor controller 50 may be provided to control a second motor 13 in the same manner as described for the control of the motor 10. When a motor select signal on the line 30b is received by the AND gate 26 in the controller 50, the motor 13 is rotated in accordance with the command signal from the comparison means 18 to the desired position determined by the command storage 16. The command signals from the comparison means 18 are common to each of the AND gates 25 and 26 in the controllers 30 and 50 for the motors 10 and 13. Each of the AND gates 25 and 26 simultaneously receive the command signals from the output of the comparison means 18, but only one AND gate at a time receives a motor select pulse. In this manner, the command signals from the computer 12 are shared by each of the controllers 30 and 50 for the motors 10 and 13. Although FIG. 1 shows two motors, it is to be realized that the same time sharing may be utilized by any number of motors being controlled by the single digital computer 12, with a corresponding motor select line 30 for each motor controlled. In this manner, the control logic and circuit in the computer 12 is greatly simplified.

Figure 2:
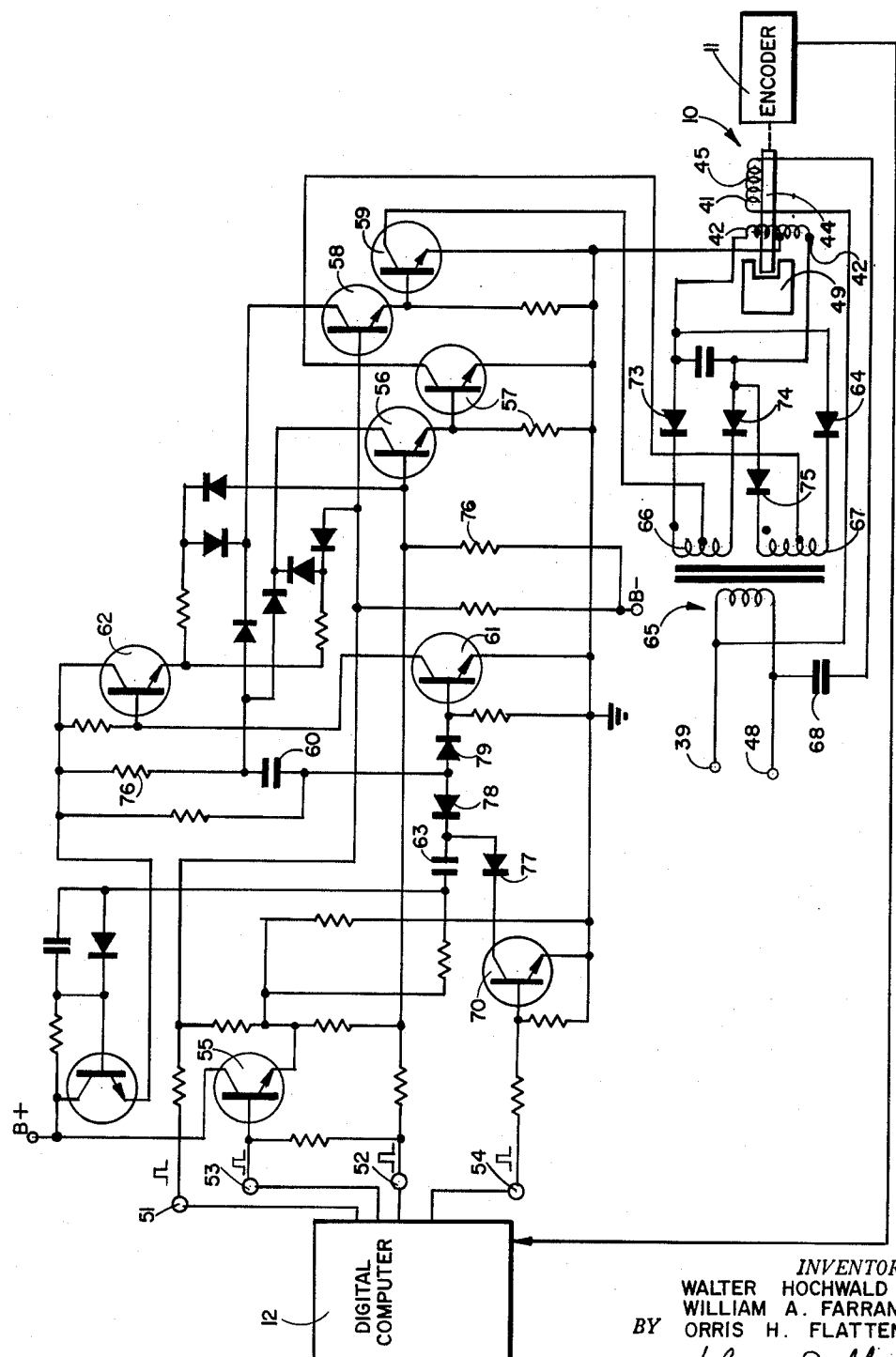
FIG. 2 is a schematic diagram of one aspect of the invention illustrating one aspect of the motor control circuitry of the device in FIG. 1.

Referring now to FIG. 2, there is illustrated a schematic circuit diagram showing one type of system which may be utilized to provide the motor control function of the controller 30 of FIG. 1. In FIG. 2, the motor 10 of FIG. 1 presents a shaft output to the encoder 11 which in turn is sampled sequentially by the digital computer 12 which modifies the encoder output to produce a serial digital number representing the position of the shaft of the motor 10. The digital computer 12 then provides command signals including a positive command signal at the terminal 51, a negative command signal at the terminal 52, a motor select signal at the terminal 53, and a slew command signal at the terminal 54. Each of the signals at the terminals 51, 52, 53, and 54 is a positive polarity pulse of comparatively short time duration. The transistors 55, 56, 57, 58, and 59, with associated circuitry comprise the AND gate 25 of FIG. 1. Upon coincidence of a positive command signal at the terminal 51, and a select signal at the terminal 53, the transistor 58 responsive to the signal from terminal 51 conducts and in turn causes conduction in the emitter-follower transistor 59. The transistor 55, responsive to the signal from the terminal 53 conducts and in turn causes conduction in the emitter-follower transistor 61. A transistor 62, having its base connected to the collector of the transistor 61, conducts when transistor 61 conducts. The transistor 58, having its base coupled to the emitter of the transistor 62, is maintained in conduction after the short duration pulse from the terminal 51 ceases, for the time that transistor 62 conducts. The circuitry of transistors 61 and 62 acts as a single shot multivibrator with the time of conduction determined by the time constant circuitry of a resistor 76 and a capacitor 60 which are series coupled from the collector of the transistor 62 to the base of the transistor 61. In this manner, transistors 58 and 59 are conducting for a time determined by the time constant of the multivibrator.

Upon coincidence of a negative command signal at the terminal 52 with a select signal at the terminal 53, transistor 56, and in turn transistor 57, responsive to the signal at the terminal 52 conduct. Again, the transistors 61 and 62 form a multivibrator circuit triggered by the select signal at the terminal 53 to maintain conduction in transistors 56 and 57 for a duration determined by the time constant circuit of the resistor 76 and the capacitor 60.

Assuming a negative command signal at the terminal 52, transistor 57 during conduction, operates as a switch-to-switch alternating-current power from the terminals 39 and 40 through a transformer 65 to the winding 41 of the motor 10 in a manner to be more fully described below. Similarly, for a positive command signal, the transistor 59 conducts operating as a switch to supply alternating current through the transformer 65 to the winding 41. The secondary winding 66 of the transformer 65, operable upon conduction of the transistor 59 during positive command and select command signals, provides a signal to the winding 41 between terminal 42 and the midpoint of winding 41, causing the motor 10 to rotate in one direction. The secondary winding 67 is controlled by the switching action of the transistor 57 responsive to minus command and select command signals to rotate the motor 10 in the other direction. The winding 45 of the motor 10 receives alternating current from the terminals 39 and 40 shifted in phase 90 degrees by a circuit including the capacitor 68.

Upon receipt of a slew command signal at the terminal 54, the transistor 70 conducts and has its collector coupled to the base of the transistor 61 through the diodes 77, 78, and 79 and connected to one side of a capacitor 63 through the diode 77 to vary the time constant of the multivibrator circuit of transistors 61 and 62. Thus, the capacitor 63 is in parallel with the capacitor 60 to lengthen the time of conduction of the transistors 61 and 62 and in turn, transistor 58 and transistor 56. In this manner, the switches of transistors 57 and 59 are closed providing alternating-current power to the motor 10 for a larger time than in the absence of a slew command signal. When no pulse is presented at the terminal 54, the transistor 70 is cut off, decoupling the capacitor 63 from the time constant circuitry.

Thus, it may be seen in the operation of the circuit of FIG. 2, that the transistors 57 and 59 combine to operate as an alternating-current switch, controlling the application of power from the terminals 39 and 40 to the winding 41 of the motor 10. More particularly, the winding 66 has its midpoint connected through the collector-emitter path of the transistor 59 to ground. Also, the midpoint of the winding 41 of the motor 10 is connected to ground. In operation, when the transistor 59 switches the alternating-current power from the terminals 39 and 40 through the secondary winding 66 to the winding 41, the inclusion of a pair of diodes 73 and 74 connect the terminals of the winding 66 across the terminals of the winding 41 provides the necessary circuitry for the switching control. When the transistor 59 is conducting during the first half-cycle of operation, as shown by the polarity dot of the winding 66, indicative of a positive potential, a current path is created comprising in series, for electron flow, the lower terminal of the winding 66, the diode 74, the lower terminal of the winding 41, and ground as connected to the midpoint of the winding 41. For the next half-cycle when the upper terminal of the winding 66 is minus and polarities are reversed, a current path is created comprising the upper terminal of the winding 66, the diode 72, the upper terminal of the winding 41 and ground. Similarly, the diodes 75 and 64 connect the secondary winding 67 across the winding 41 when the transistor 57 is conducting for minus command signals. In this manner, alternating current is supplied to the winding 41 from the terminals 39 and 40 through the winding 66 when the transistor 59 is conducting and through the winding 67 when the transistor 57 is conducting.

The motor 10, as shown in FIG. 2, may include an inertial damping system to provide rate stabilization of the motor. The windings 41 and 45 are wound about the shaft 48 which is magnetically coupled to a mass 49 in a manner well known in the electrical motor art to provide inertial damping of the shaft 48.

Figure 3:
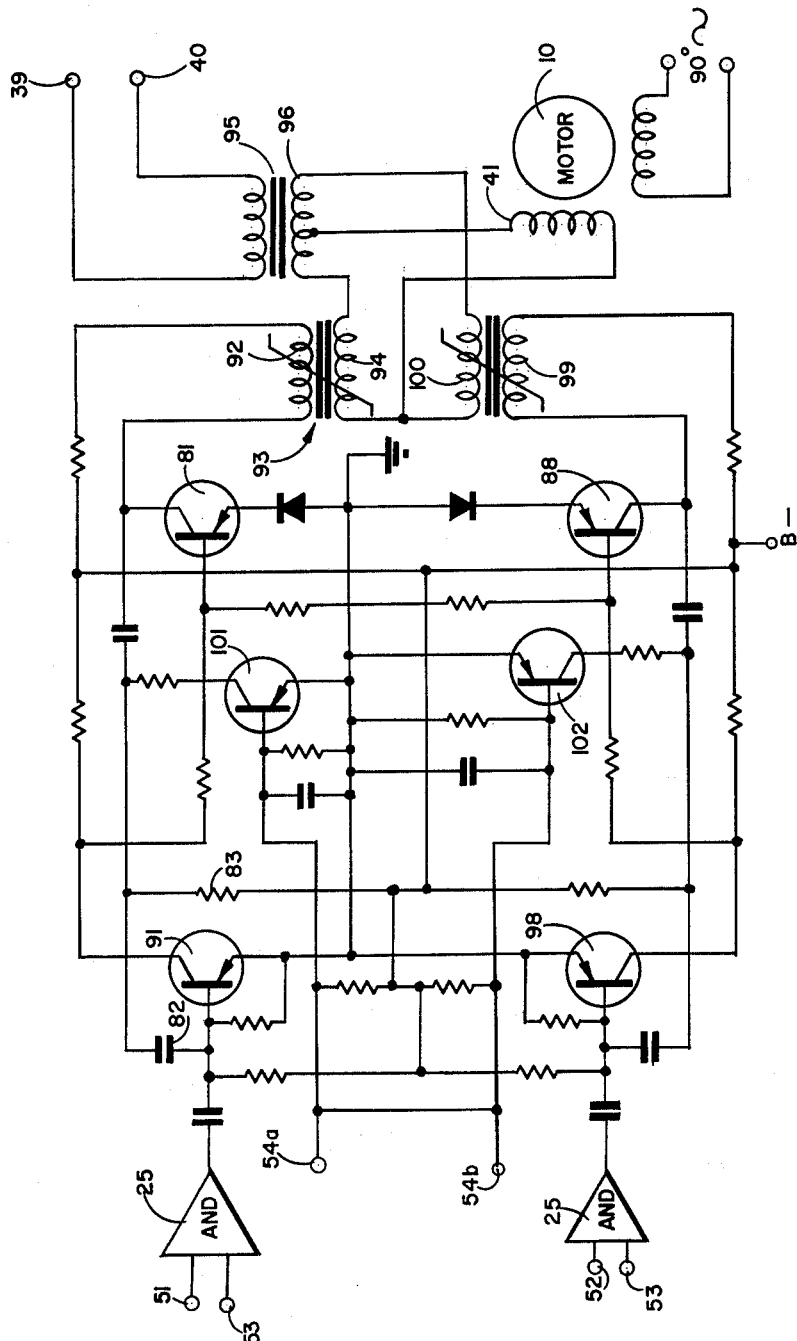
FIG. 3 is a schematic diagram illustrating another aspect of the motor control circuitry including a saturable reactor type motor control.

Referring now to FIG. 3, there is shown another aspect of applicant's invention wherein saturable reactor circuitry in co-operation with transistor circuitry may comprise the motor controller 30 of FIG. 1, illustrated by the AND gate 25, the pulse stretcher 22, and the power switch 37. In FIG. 3, the terminal 51 is responsive to positive command signals from the digital computer 12 (not shown), the terminal 52 is responsive to the minus command signals, the terminal 53 is responsive to the select command signals, and the terminal 54 is responsive to the slew command signals. The positive command signal applied to the terminal 51 is coupled to the base of a normally conducting transistor 91 through the AND gate 25 to cause non-conduction therein. The collector of the transistor 91 is coupled to the base of a transistor 81, causing conduction therein providing a current path through a primary winding 92 of a saturable reactor 93. A secondary winding 94 induces a current through the winding 41 of the motor 10. Alternating-current for the saturable reactor is provided through the terminals 39 and 40 which provide current through a primary winding of a transformer 95 to a secondary winding 96 which is in series with the control winding 94 of the reactor 93. Similarly, upon application of a negative command signal to the input terminal 52 through the AND gate, the transistor 98 is cut off causing conduction in a transistor 88, providing a flow of current through a primary winding 99 which induces current in a secondary winding 100, thereby providing for the flow of current through the secondary winding 96 in a direction opposite to that when the control winding 94 has current induced therein. Thus, motor 10 is caused to rotate in a direction opposite to the initial direction. For larger command signals, upon receipt of a slew command signal at the input terminal 54a for positive command signals and 54b for negative command signals, the transistors 101 and 102 conduct and depending upon which of the normally conducting transistors 81 or 88 are cut off, allows the transistor (81, for example) to be closed for a larger period of time, thereby causing the motor 10 to rotate to a further position. Thus, if transistor 81 is conducting, a slew command signal at the terminal 54a cuts off the transistor 101 which maintains conduction in the transistor for a time after removal of the input pulses at terminals 51 and 53. Transistors 101 and 91 act as a monostable multivibrator having a time constant determined by a resistor capacitor circuit including the capacitor 82 and resistor 83. A similar action occurs upon receipt of a slew pulse at the terminal 54b.

Figure 4:
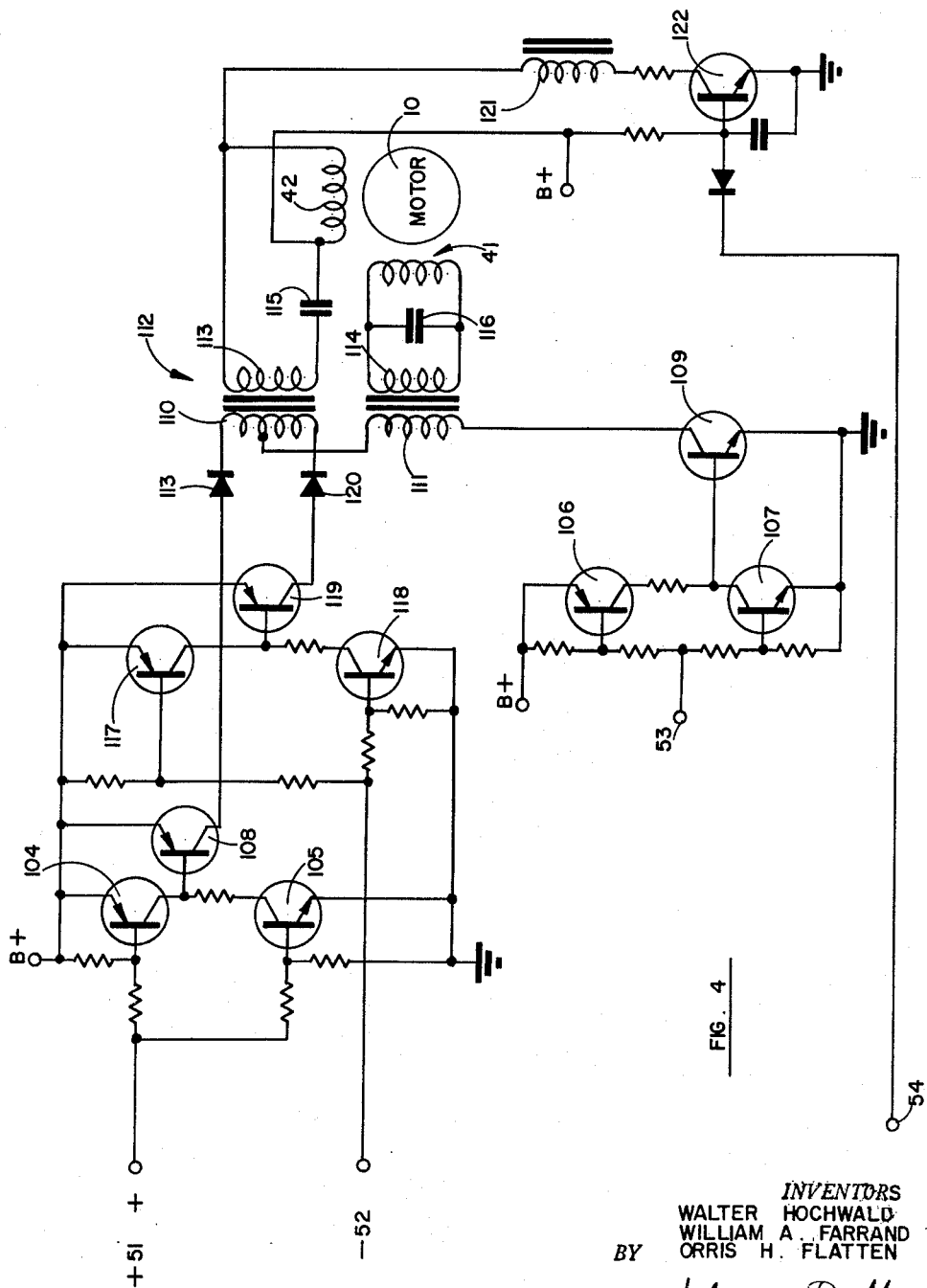
FIG. 4 is a schematic diagram illustrating a pulse type of motor control for the device of FIG. 1.

Referring now to FIG. 4, there is shown another aspect of applicants' invention in which the motor controller 30 of FIG. 1 comprises a transistorized pulse type system in which direct current is converted directly to a two-phase alternating-current control current by the use of tuned circuitry. In FIG. 4, the terminal 51 is responsive to positive command signals, the terminal 52 is responsive to negative command signals, the terminal 53 is responsive to select command signals, and the terminal 54 is responsive to slew command signals. Upon coincidence of a signal at the terminal 51 and the terminal 53, for example, transistors 104 and 105 conduct, and upon coincidence of a select signal at the terminal 53, the transistors 106 and 107 conduct. As a result therefrom, the transistors 108 and 109 conduct creating a current path through the primary windings 110 and 111 of the transformer 112. A current path then includes in series the B+ terminal, the transistor 108, the diode 113, the winding 110 from the upper terminal to the midpoint, the winding 11, the transistor 109 and ground. The secondary windings 113 and 114 of the transistor 112 are capacitively tuned by a capacitor 115 for the winding 113 and a capacitor 116 for the winding 114 to provide alternating current of two phases through the windings 41 and 42. The winding 42 receives an alternating current of the frequency determined by the resonant circuit of capacitor 115 and winding 113 and is 90 degrees out of phase with the alternating current received by the winding 41 by reason of the parallel tuning of the capacitor 116 with the winding 114 and the servo tuning of the capacitor 115 with the winding 113. In this manner, direct current is converted directly to a two-phase alternating-current pulse control for the motor 10. In operation when a negative command signal is received at the input terminal 52 coincident with a select signal at the terminal 53, the transistors 106, 117, and 118 conduct, causing conduction of a transistor 119 with a series current path created comprising the plus terminal, the transistor 119, the diode 120, the lower terminal of the winding 110, ground, the winding 11, the transistor 109, and ground. Thus, the current to the winding 110 has been reversed causing a 90 degree phase angle between the current in the winding 41 and the current in winding 42, thereby rotating the shaft of the motor 10 in an opposite direction. When a slew command signal is received at the input terminal 54, the normally conducting transistor 122 is cut off, reducing the flow of direct current in the winding 42 which, by reducing the damping of the motor, allows the motor speed to increase. The inductor 121 is placed in series with the transistor 122 to provide proper electrical damping.

The digital servo positioning control device, as described in this invention, is particularly adaptable to the control of several motors in the system wherein command signals from the computer are time shared by all of the control systems with one particular motor operating at a time, depending on the select signal from the digital computer. The computer may provide in sequence a signal to each motor controller at appropriate time, determined by the timing in the computer and in this way insure that only one motor controller will interpret the signals at any particular given time. Each of the control systems shown is operable upon receipt of a motor select signal corresponding to the motor and the various position command signals received from the digital computer 12.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a digital servo motor positioning system with a plurality of electrical motors, a respective analog to digital parallel encoder means connected to be driven by each of said motors, means for serializing the outputs of said encoders, comparison means adapted to receive a position command signal in digital form and the output of said serializing means, a respective gate connecting the output of said comparison means to said motors, and means for generating selective control signals for said gates whereby said motors are selected for operation.

2. The combination recited in claim 1 wherein said means for generating selective control signals is in synchronism with said means for serializing.

3. In a digital servo motor positioning system including a plurality of electrical motors for producing an output shaft movement in response to an electrical input signal, encoder means for simultaneously generating a plurality of digital pulses indicative of the shaft movement of one of said motors, means responsive to said pulses for storing the digits of a position number indicative of said shaft movement, means for storing the digits of a command number indicative of a predetermined shaft position, comparison means for generating a command signal sequentially indicative of the sense of the difference between corresponding digits of successive like orders of said command and position numbers, counting means responsive to said comparison means for determining the magnitude of said difference signal and generating a slew command signal when said difference reaches a predetermined magnitude, coincidence means responsive to said command signal and a motor select signal corresponding to said one motor for generating a drive signal, means responsive to said drive signal and said slew command signal for generating said electrical input signal, said electrical input signal being of higher magnitude because of said slew command signal.

4. The combination recited in claim 3 wherein said electrical motor includes means for damping the rate of movement of the shaft of said one motor.

5. In a digital servo motor including an alternating current motor for producing an output shaft movement in response to an electrical input, an encoder for generating a plurality of pulses in digital binary form indicative of said shaft movement, means for storing the digits of a command number indicative of a predetermined shaft position, an error counter for continuously recording the difference between said encoder digital pulses and the digits of said command number, means responsive to said error counter for determining the magnitude of said difference and for generating a first command signal indicative of said difference below a predetermined magnitude and for generating a second command signal indicative of said difference above a predetermined magnitude, means for storing select signals indicative of a plurality of motors, coincidence means responsive to one of said select signals and said first command signal for generating a first drive signal, means responsive to said drive signal and said second command signal for generating a second drive signal of greater magnitude than said first drive signal, and means alternatively responsive to said first and second drive signal for generating said electrical input signal to said motor.

6. A digital servo system comprising a plurality of alternating-current motors each for producing output shaft movements and electrical outputs as a predetermined function of said output shaft movements, comparator means responsive to said electrical outputs and adapted to receive a command motion signal input for producing an error signal indicative of the difference between the inputs thereto, coincidence means responsive to said error signal and a motor select signal input for producing a drive signal, and means responsive to said drive signal for providing an electrical input signal to one of said alternating-current motors.

7. The combination recited in claim 6 wherein is included means responsive to a predetermined large error signal from said comparator means for increasing the amount of said drive signal.

8. The combination recited in claim 6 wherein said drive signal is a pulse signal, and wherein said means responsive to said pulse signal comprises a transformer having a primary winding connected to receive said pulse signal and having first and second windings for providing the electrical input signal to said alternating-current motor, series resonant tuning means in circuit with said first recording winding and one winding of said alternating-current motor for providing alternating-current of a predetermined zero degree phase angle, and parallel resonant tuning means in circuit with said secondary winding and a second winding of said alternating-current motor for providing alternating current of a 90 degree phase angle.

9. The combination recited in claim 6 wherein said means responsive to said drive signal for providing an electrical input signal to said alternating-current motor comprises a transistor having base, collector, and emitter electrodes, a pair of diodes, a source of A.-C. having one terminal connected to the collector of said transistor and the terminal connected to the cathode of said diode, a winding of said motor having one terminal connected in common with said emitter electrode to an alternating-current ground terminal, said base being responsive to said drive signal to connect said A.-C. source across the winding of said motor.

10. In a digital servo system having a two-phase alternating-current motor for producing an output shaft movement and an electrical output as a predetermined function of said shaft output, comparison means responsive to said electrical output, a source of motion signals for producing an error pulse signal indicative of the difference between the inputs thereto, means responsive to said error pulse signal for producing a drive pulse signal of predetermined width, a transformer having a primary winding responsively coupled to receive said drive pulse signal and having a pair of secondary windings to provide current to said alternating-current motor, series tuning means for coupling one of said secondary windings to one of said phase windings, and parallel tuning means for coupling the other of said secondary windings to the other of said phase windings.

11. The combination recited in claim 10 wherein is included pulse width stretching means responsive to said comparison means to provide a drive pulse signal of greater width than said predetermined width when the difference between the inputs to said comparison means reaches a predetermined magnitude.

12. The combination recited in claim 10 wherein is included means for inertially damping said motor.

References Cited in the file of this patent
UNITED STATES PATENTS
2,537,427  Seid et al. _____ Jan. 9, 1951